(12) United States Patent
Healy

(10) Patent No.: US 7,406,914 B1
(45) Date of Patent: Aug. 5, 2008

(54) MODULAR BLADE ASSEMBLY FOR PRODUCE PEELING AND CORING

(76) Inventor: Daniel P. Healy, 119 S. Bayly Ave., Louisville, KY (US) 40206

( * ) Notice: Subject to any disclaimer, the term of this patent is extended or adjusted under 35 U.S.C. 154(b) by 673 days.

(21) Appl. No.: 11/020,434

(22) Filed: Dec. 22, 2004

Related U.S. Application Data

(60) Provisional application No. 60/579,381, filed on Jun. 14, 2004.

(51) Int. Cl.
*A23N 4/20* (2006.01)
(52) U.S. Cl. .......................................... 99/542; 99/544
(58) Field of Classification Search .................. 99/544, 99/542, 543, 545; 30/301, 302, 130; 83/621, 83/932, 588, 613
See application file for complete search history.

(56) References Cited

U.S. PATENT DOCUMENTS

| | | | | |
|---|---|---|---|---|
| 205,122 A | * | 6/1878 | Morrow | 99/545 |
| 419,722 A | * | 1/1890 | Siersdorfer | 99/545 |
| 1,146,085 A | * | 7/1915 | McVey | 99/545 |
| 4,653,393 A | * | 3/1987 | Ross | 99/542 |
| 4,718,333 A | | 1/1988 | Pierce et al. | |
| 4,741,265 A | | 5/1988 | Cushman | |
| 4,834,795 A | | 5/1989 | Raub et al. | |
| 5,067,397 A | | 11/1991 | Healy | |
| 5,142,972 A | | 9/1992 | Sundquist | |
| 5,454,301 A | | 10/1995 | Rainey et al. | |
| 5,463,943 A | * | 11/1995 | Knasel | 99/542 |
| 6,148,719 A | | 11/2000 | Poltielov | |
| D464,537 S | * | 10/2002 | Healy | D7/693 |

FOREIGN PATENT DOCUMENTS

| | | |
|---|---|---|
| GB | 509487 | 10/1937 |
| GB | 764717 | 1/1957 |
| GB | 1569019 | 6/1980 |

* cited by examiner

*Primary Examiner*—Reginald L Alexander
(74) *Attorney, Agent, or Firm*—John Salazar; Middleton Reutlinger

(57) ABSTRACT

A produce peeling and coring device having a modular blade assembly which can be removed and positioned on numerous machine embodiments, such as freestanding machines, wall-mount machines, and tabletop machines.

24 Claims, 18 Drawing Sheets

MODULAR BLADE ASSEMBLY FOR PRODUCE PEELING AND CORING

CROSS-REFERENCE TO RELATED APPLICATIONS

This application claims priority to and benefit of Provisional Application No. 60/579,381, filed Jun. 14, 2004.

STATEMENT REGARDING FEDERALLY SPONSORED RESEARCH OR DEVELOPMENT

Not applicable.

REFERENCE TO A "SEQUENTIAL LISTING," A TABLE, OR A COMPUTER PROGRAM LISTING APPENDIX SUBMITTED ON A COMPACT DISC

Not applicable.

BACKGROUND OF THE INVENTION

1. Field of the Invention

The present invention relates generally to fruit and vegetable peeling and coring devices, and more specifically to devices for simultaneously removing the inedible peel and core of pineapples from the edible flesh quickly and efficiently.

2. Description of the Related Art

Various produce peeling and coring devices are known in the art. For example, U.S. Pat. No. 4,741,265, issued to Cushman, teaches a pineapple corer and peeler having a rotating core cutting tube and a peeler blade. U.S. Pat. No. 4,834,795, issued to Raub, et al., teaches a semiautomatic pineapple peeler having concentric cylindrical knives. U.S. Pat. No. 5,463,943, issued to Knasel, teaches a peeling and coring apparatus having an inner cutting blade and an outer cutting blade coaxially aligned with each other. U.S. Pat. No. 6,148,719, issued to Poltielov, teaches a coring apparatus having a coring blade with teeth.

None of these inventions, however, teach a modular blade assembly, comprising a peeling blade and a coring blade, that can be removed as a unit and placed on various machine structures, such as wall mounted machines, free standing machines, and tabletop machines. The blade assemblies in the prior art are actually integrated into a machine, whereby the machine provides support and the leverage for moving the cutting and coring blades. The blade assemblies in the prior art cannot be removed as a unit and placed in various machine structures.

A produce peeling and coring assembly having a modular blade assembly that is efficient, easy to clean, easy to assemble and disassemble, and thoroughly peels and cores produce, is desired. Furthermore, a modular blade assembly that can be removed as a unit and placed on various machine structures, such as wall mounted machines, free standing machines, and tabletop machines is desired.

SUMMARY OF THE INVENTION

In view of known deficiencies associated with earlier produce peeling and coring devices, the instant invention provides a modular blade assembly for peeling and coring produce such as pineapples. The blade assembly is a modular unit and can be transferred among various machine structures to support the blade assembly. The blade assembly is not permanently integrated into the structure of a particular machine, and is attached to a machine via fasteners. The blade assembly has an inside cylindrical blade for separating the core of the produce from the edible flesh of the produce. The inside cylindrical blade is vertically positioned with an inside cylindrical cutting edge at one end. An outside cylindrical blade for removing the outer peel of the produce from the edible flesh is positioned coaxial to the inside cylindrical blade with the cutting edge of the outside cylindrical blade coplanar with the cutting edge of the inside cylindrical blade. A first radial blade extends outward from the outside cylindrical blade and a second radial blade extends outward from the outside cylindrical blade. The first radial blade and the second radial blade are diametrically opposed. The cutting edges of the first radial blade and of the second radial blade are coplanar with the cutting edge of the outer cylindrical blade and the inner cylindrical blade.

The inside cylindrical blade is attached to a machine structure, which provides the support and the leverage required for cutting produce, via a first inside cylindrical blade arm and a second inside cylindrical blade arm. The outside cylindrical blade is attached to a machine structure via a first outside cylindrical blade arm and a second outside cylindrical blade arm. A first arm projection on the first outside cylindrical blade arm is attached via a fastener to the first radial blade, and a second arm projection on the second outside cylindrical blade arm is attached via a fastener to the second radial blade. The first radial blade and the second radial blade are diametrically opposed and are attached to the outside cylindrical blade. The fasteners allow for easy removal, cleaning, and blade replacement of the outside cylindrical blade, the first radial blade and the second radial blade, depending on produce size, while the rest of the modular blade assembly can remain attached to the machine structure.

The modular blade assembly is attached to supporting machines configured in numerous different embodiments. A multitude of different machine structures can be utilized to hold and support the modular blade assembly. The supporting machines, such as a freestanding machine, a tabletop machine, and a wall mount machine, embodiments described herein, all have certain features in common, and their similarities and differences will be described in more detail.

For a better understanding of the present invention, together with other and further objects thereof, reference is made to the following description, taken in conjunction with the accompanying drawings, and its scope will be pointed out in the appending claims.

BRIEF DESCRIPTION OF THE DRAWINGS

The aspects and advantages of the present invention will be better understood when the detailed description of the preferred embodiment is taken in conjunction with the accompanying drawings, in which.

DETAILED DESCRIPTION OF THE PREFERRED EMBODIMENTS

Figure 1:
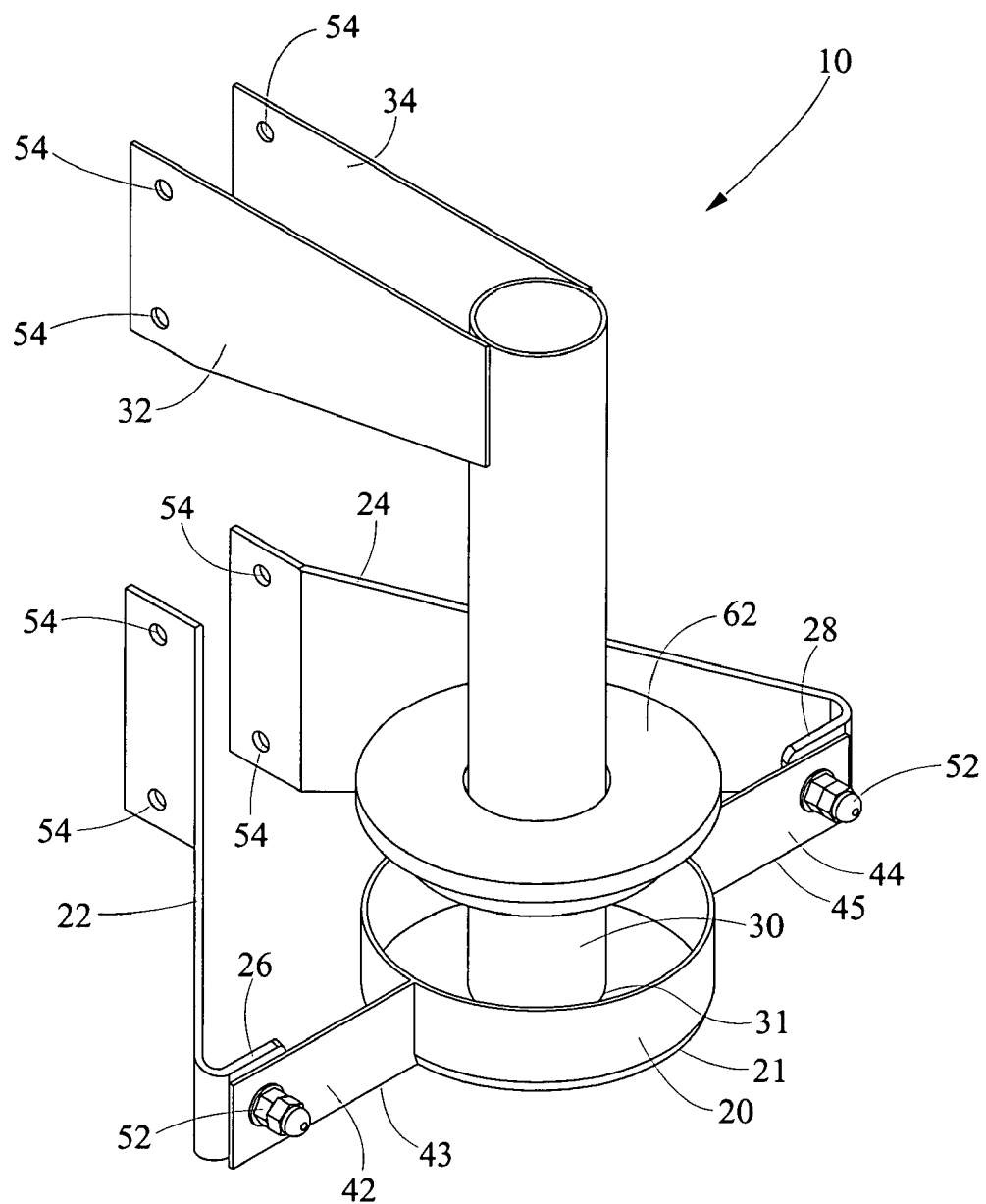
FIG. 1 is a perspective view of an embodiment of the modular blade assembly of the present invention.
Figure 2:
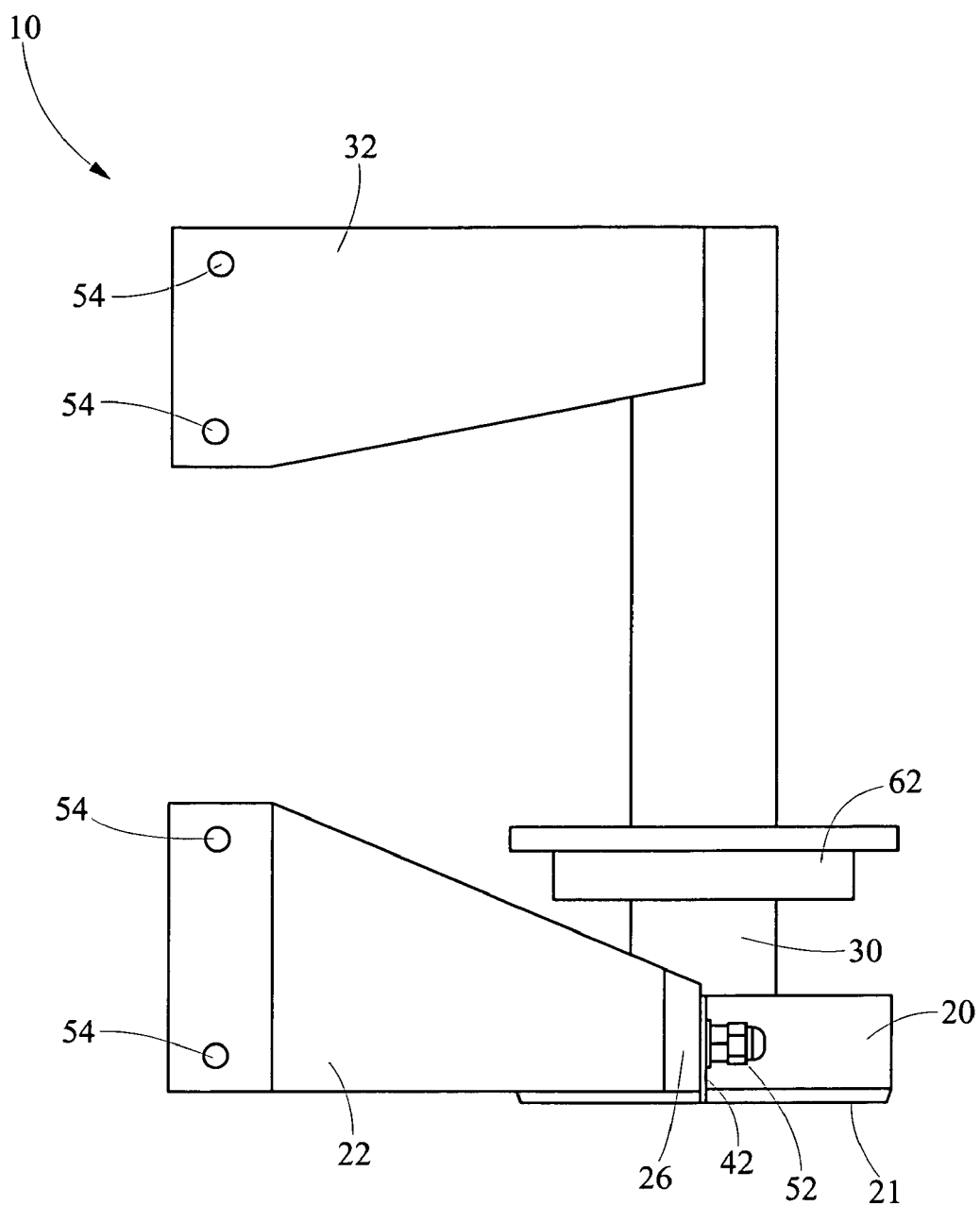
FIG. 2 is a side view of the embodiment of the modular blade assembly of FIG. 1.
Figure 3:
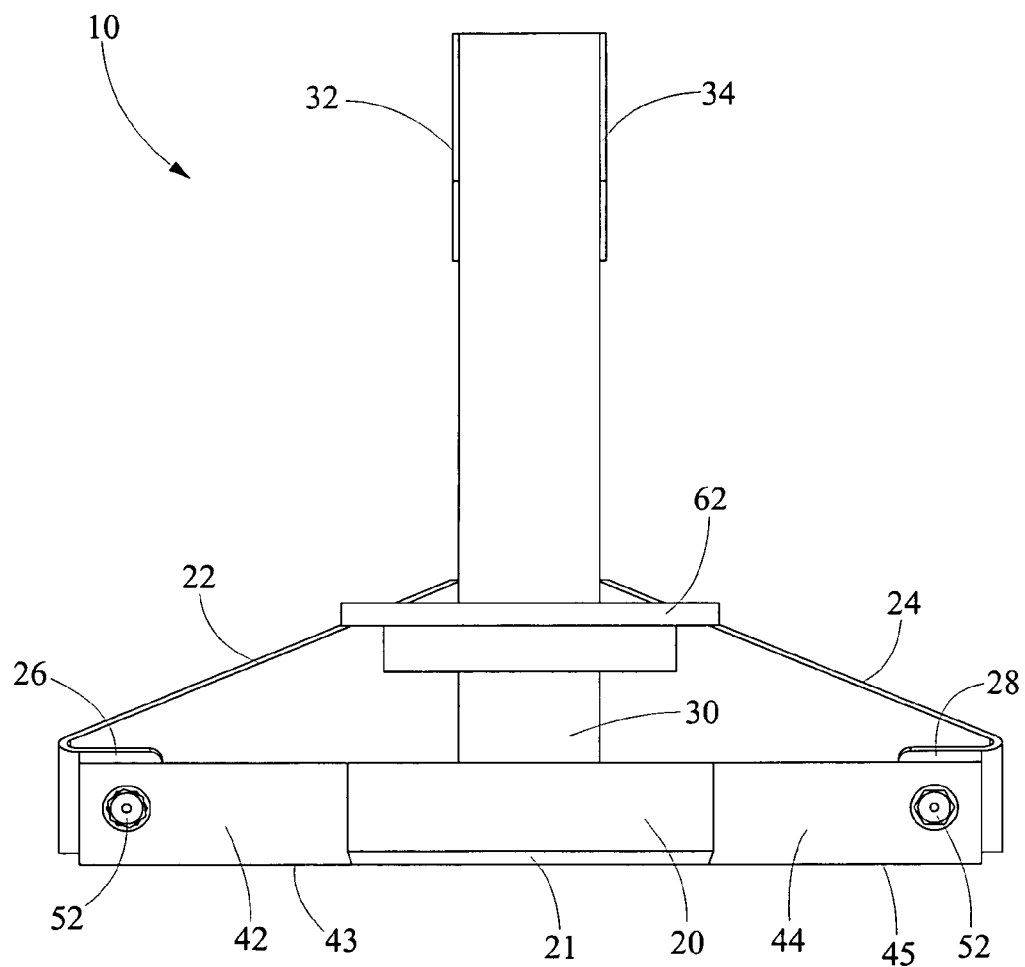
FIG. 3 is a front view of the embodiment of the modular blade assembly of FIG. 1.
Figure 4:
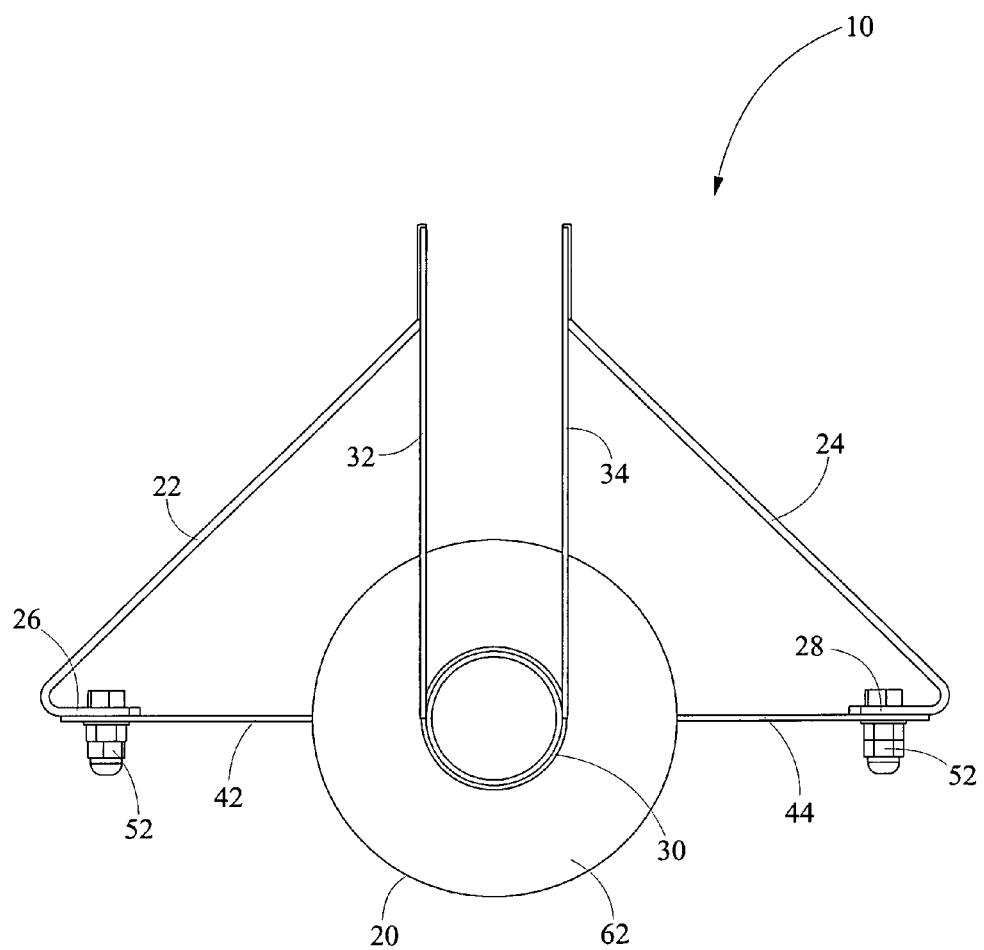
FIG. 4 is a top view of the embodiment of the modular blade assembly of FIG. 1.

While this invention is susceptible of embodiments in many different forms, there are shown in the Figures and will herein be described in detail, preferred embodiments of the invention with the understanding that the present disclosure is to be considered as an exemplification of the principles of the invention, and is not intended to limit the broad aspects of the invention to the embodiments illustrated.

With reference to FIGS. 1-4, there is shown a modular blade assembly 10 for cutting and coring produce. The modular blade assembly 10 can be transferred among various machine structures 200, 300, 400 to support the modular blade assembly 10. The modular blade assembly 10 is not permanently integrated into the structure of a particular machine structure 200, 300, 400, and is attached to a machine structure 200, 300, 400 at support bracket fastening portals 54. The modular blade assembly 10 has an inside cylindrical blade 30 for separating the core of the produce from the edible flesh. The inside cylindrical blade 30 is rigid and vertically positioned with an inside cylindrical cutting edge 31 at one end. An outside cylindrical blade 20 for removing the outer peel of the produce from the edible flesh is positioned coaxial to the inside cylindrical blade 30 with an outside cylindrical cutting edge 21 coplanar with the inside cylindrical cutting edge 31. A first radial blade 42 extends outward from the outside cylindrical blade 20 and a second radial blade 44 extends outward from the outside cylindrical blade 20. The first radial blade 42 and the second radial blade 44 are diametrically opposed, and have a first radial cutting edge 43 and a second radial cutting edge 45, respectively. The first radial cutting edge 43 and the second radial cutting edge 45 are coplanar with the outside cylindrical cutting edge 21 and the inside cylindrical cutting edge 31.

The inside cylindrical blade 30 is attached to a machine structure 200, 300, 400 via a first inside cylindrical blade arm 32 and a second inside cylindrical blade arm 34 at support bracket fastening portals 54. The outside cylindrical blade 20 is attached to a machine structure 200, 300, 400 via a first outside cylindrical blade arm 22 and a second outside cylindrical blade arm 24 at support bracket fastening portals. A first arm projection 26 on the first outside cylindrical blade arm 22 is attached via a projection fastener 52 to the first radial blade 42, and a second arm projection 28 on the second outside cylindrical blade arm 24 is attached via a projection fastener 52 to the second radial blade 44. These fasteners 52 allow easy removal of the outside cylindrical blade 20 and the diametrically opposed and attached first radial blade 42 and second radial blade 43 for cleaning and for blade replacement, depending on produce size, as the outside cylindrical blade 20 can be adjusted according to produce size. An extracting plate 62 loosely circumscribes the inside cylindrical blade 30. The extracting plate 62 has a circumference substantially equal to the circumference of the outside cylindrical blade 20. The extracting plate 62 separates the edible portion from the inedible core and peel.

The blade assembly is attached via support bracket fastening portals 54 to supporting machines 200, 300, 400 configured in numerous different embodiments 200, 300, 400. The embodiments 200, 300, 400 described herein are for example only, as a multitude of different machine structures can be utilized to hold, support, and provide leverage for the modular blade assembly 10.

Figure 5:
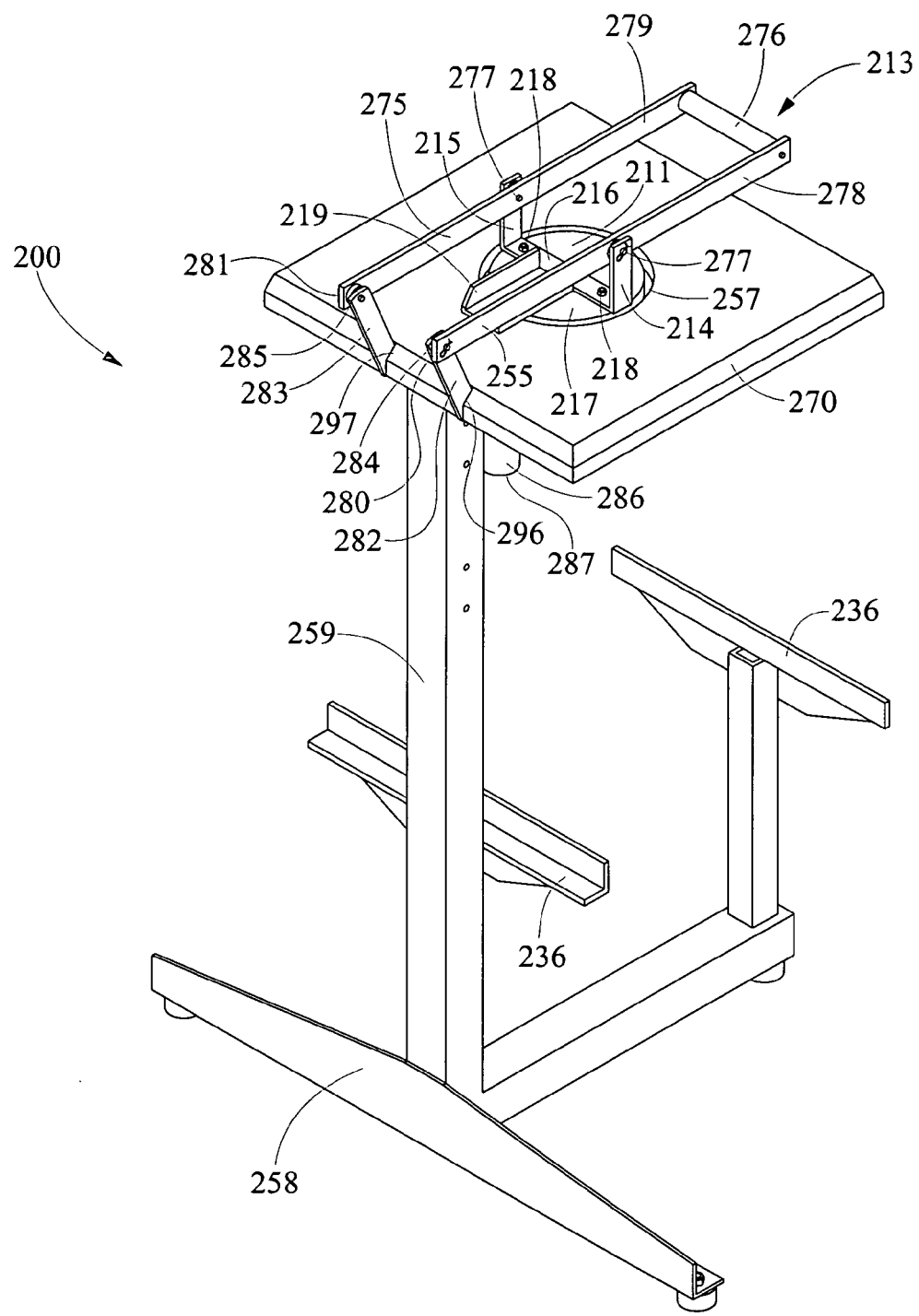
FIG. 5 is a perspective view of a freestanding machine sans a modular blade assembly.
Figure 6:
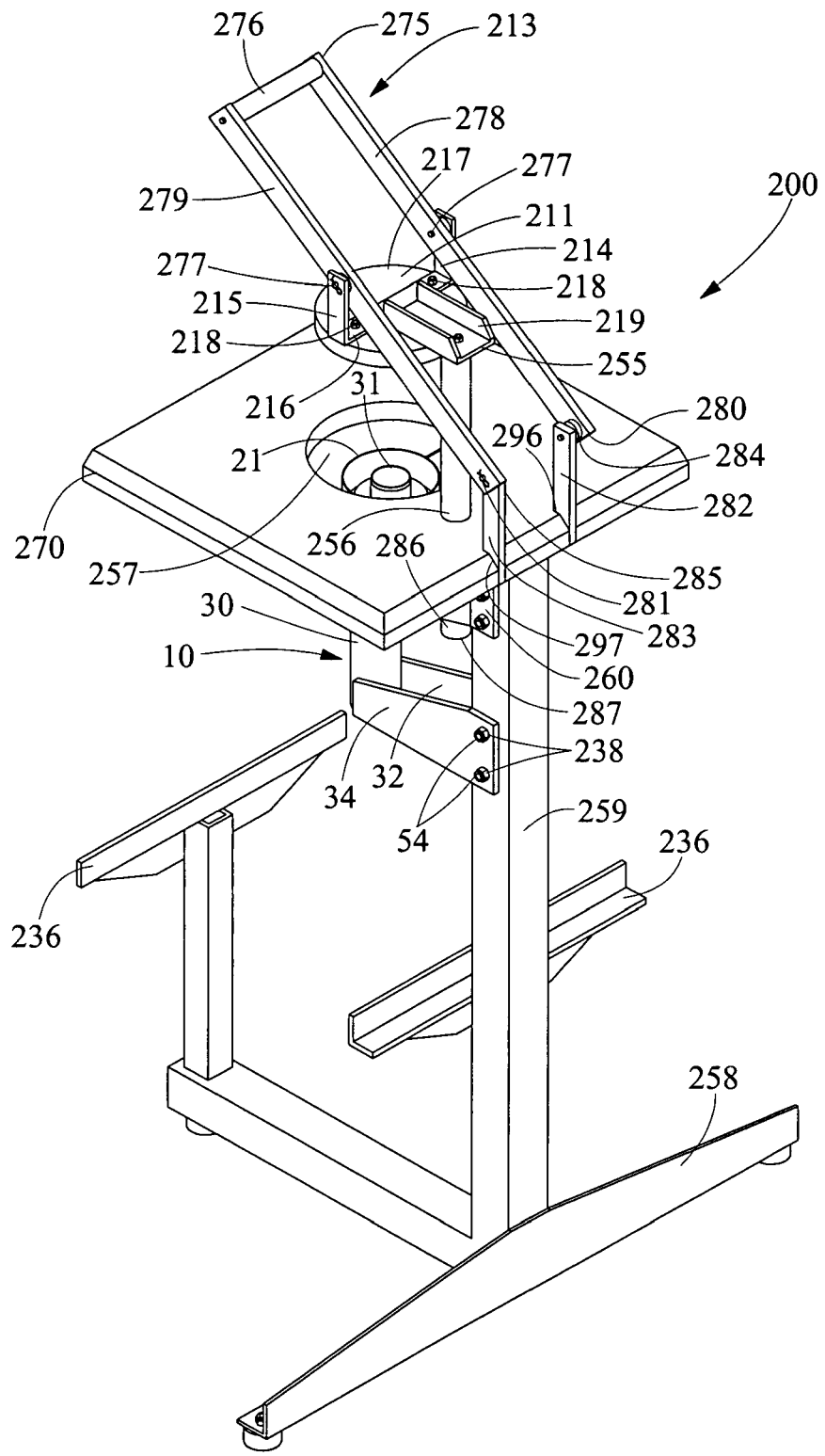
FIG. 6 is a rear perspective view of the freestanding machine of FIG. 5 with a modular blade assembly attached and in the raised position.
Figure 7:
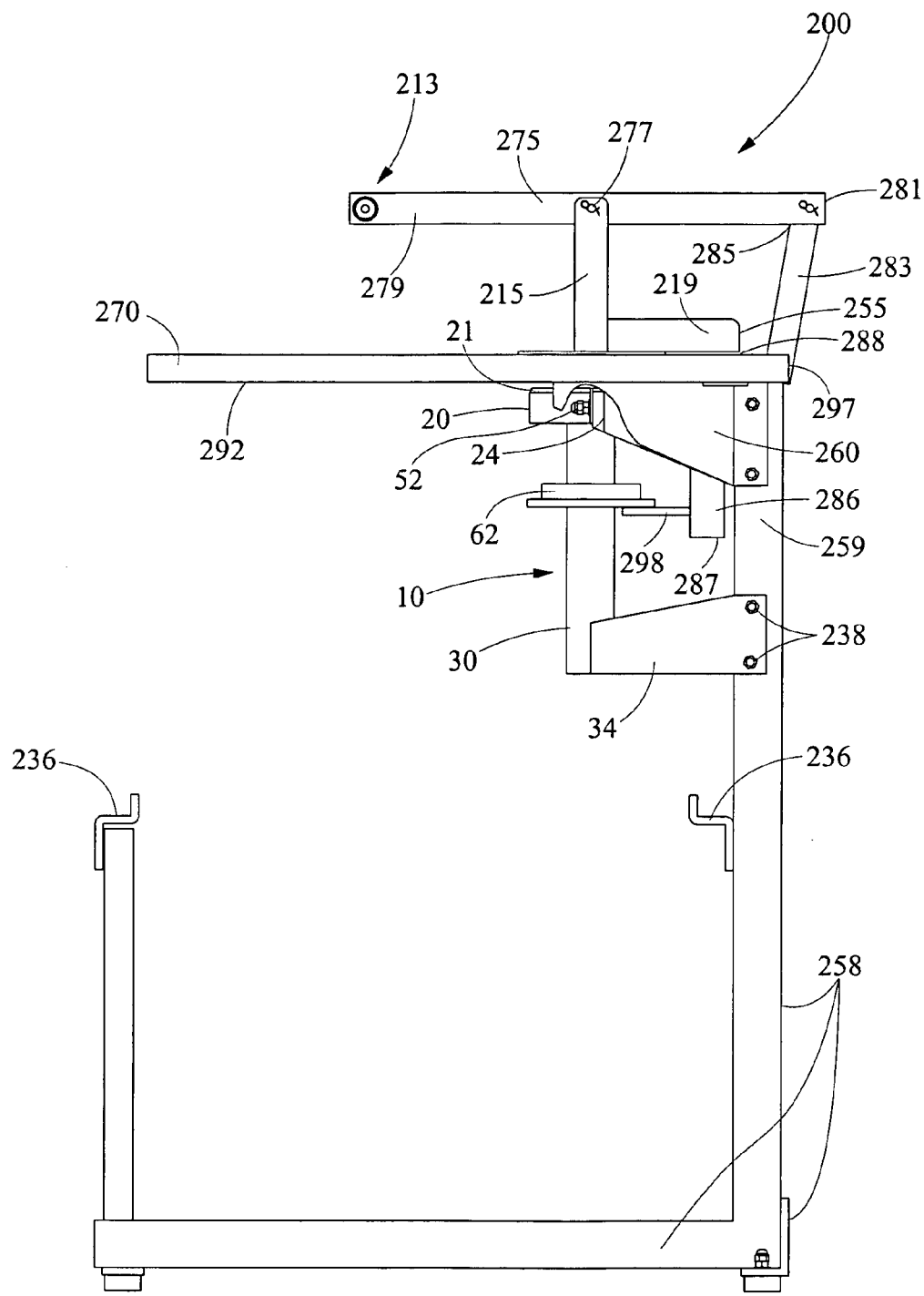
FIG. 7 is a side view of the freestanding machine of FIG. 5 with a modular blade assembly attached and in the lowered position.
Figure 8:
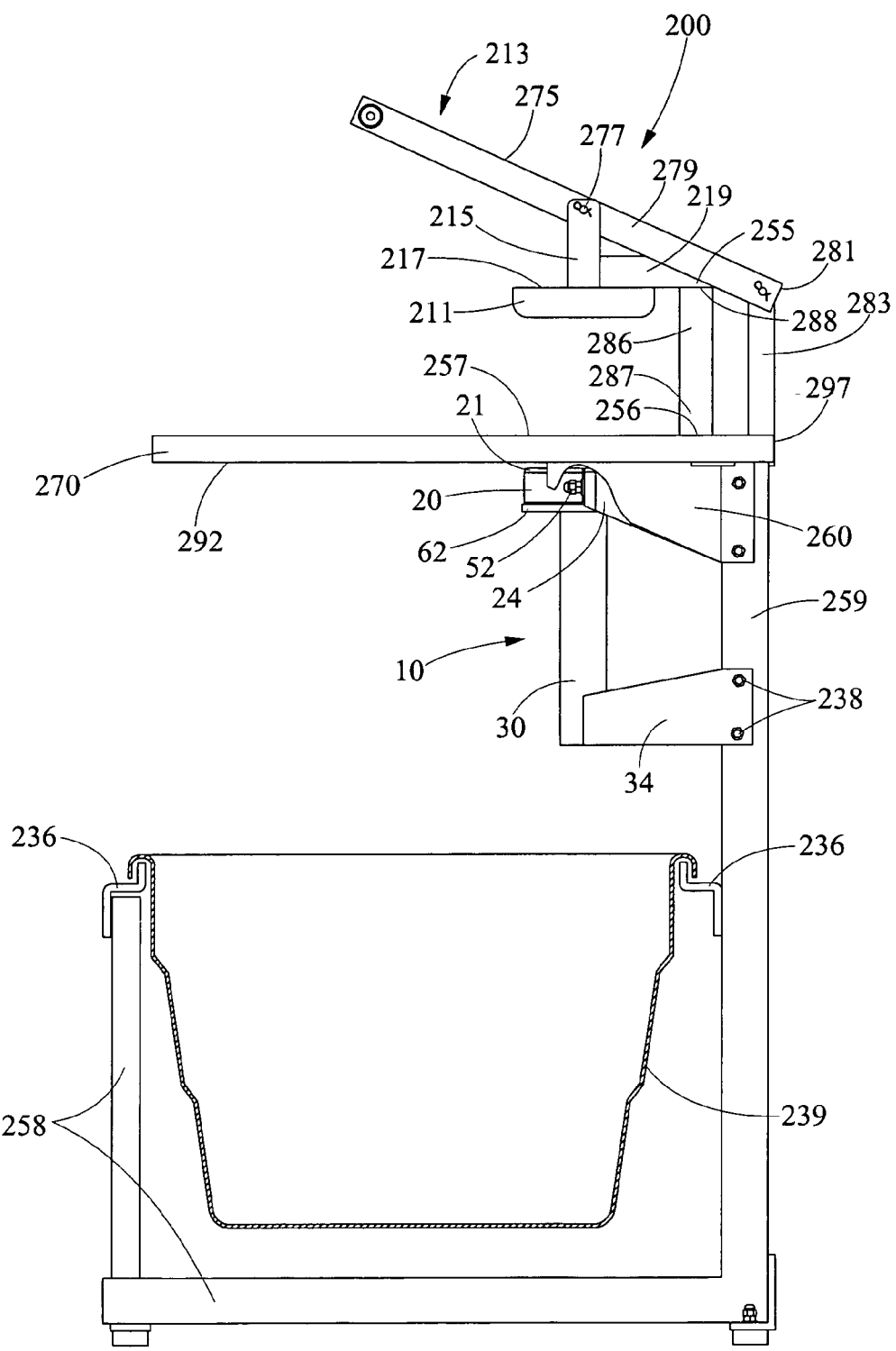
FIG. 8 is a side view of the freestanding machine of FIG. 5 with a modular blade assembly attached and in the raised position.

In one embodiment 200, there is shown in FIG. 5 a freestanding machine 200. FIGS. 6-9 show the freestanding machine 200 having a modular blade assembly 10 mounted in place. Note that the freestanding machine 200 differs from the tabletop machine 300 and the wall-mount machine 400, described subsequently, in that the modular blade assembly 10 is inverted and remains stationary throughout the coring and peeling process.

Figure 9:
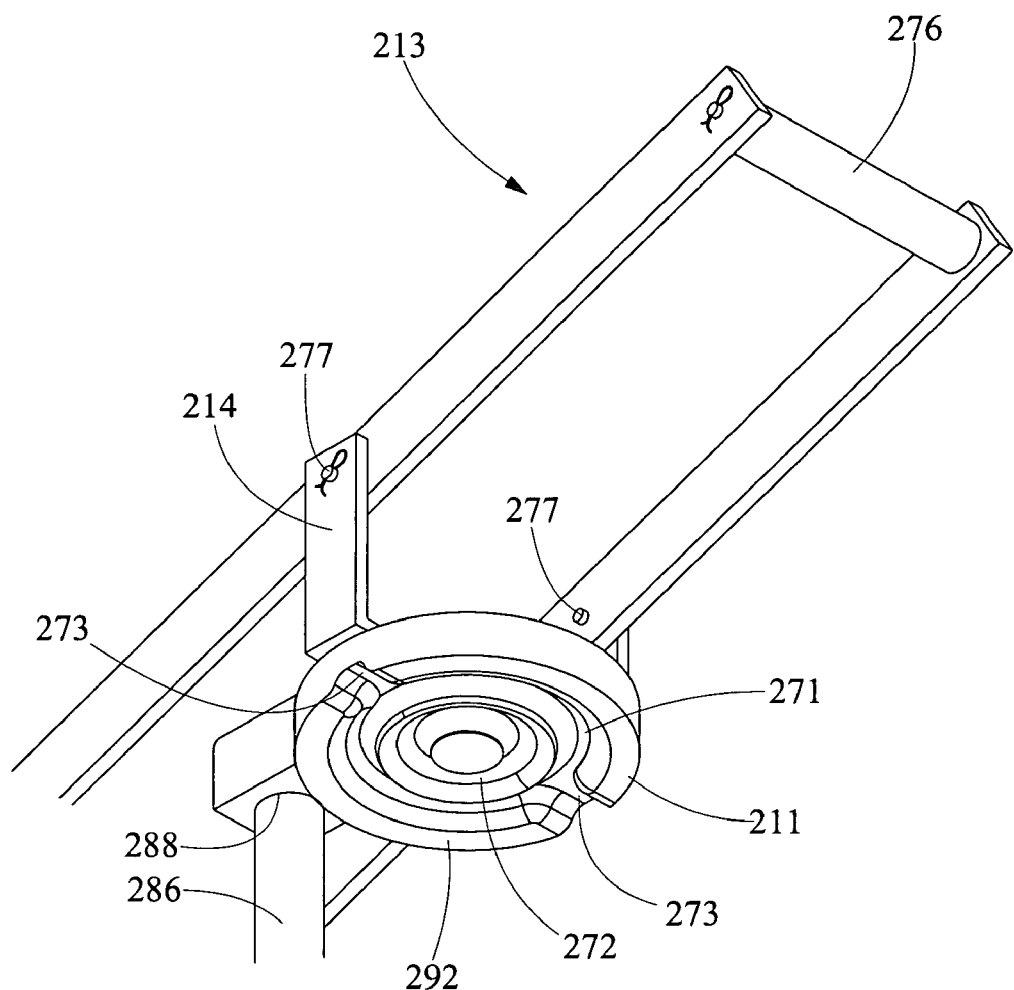
FIG. 9 is a bottom perspective view of the freestanding machine of FIG. 5 and in the raised position.

The freestanding machine 200 has a round push plate 211 attached to a push plate moving mechanism 213. The push plate 211, best shown in FIG. 9, provides resistance for the cutting force applied to the produce. The push plate 211 has an outside circular receiving groove 271 for receiving the cutting edge 21 of the outside cylindrical blade 20 of the modular blade assembly 10. The push plate 211 has an inside circular receiving groove 272 for receiving the cutting edge 31 of the inside cylindrical blade 31 of the modular blade assembly 10. The outside circular receiving groove 271 and the inside circular receiving groove 272 are concentric. A radial receiving groove 273 traverses the push plate 211 and receives the cutting edges 43, 45 of the first radial blade 42 and the second radial blade 44, respectively, of the modular blade assembly 10. When the push plate 211 is moved down toward the cutting edges 21, 31, 43, 45 of the modular blade assembly, the push plate 211 receives the cutting edges 21, 31, 43, 45 in the respective grooves 271, 272, 273 to assure that the cutting edges 21, 31, 43, 45 have passed entirely through the produce and ensuring complete severance through the produce.

The push plate 211 moving mechanism 213 moves the push plate 211 down towards the cutting edges 21, 31, 43, 45 of the stationary modular blade assembly 10, and therefore through the produce. The push plate moving mechanism 213 includes a lever arm 275, providing the means for easily moving the push plate 211 up and down. The lever arm 275 has a first lever arm 278 and a second lever arm 279 spaced apart and substantially parallel to each other and a handle 276 extending between the first lever arm 278 and the second lever arm 279. The first lever arm 278 and the second lever arm 279 have a first arm end 280 and a second arm end 281, respectively, positioned distal from the handle 276. The first arm end 280 and the second arm end 281 are pivotally attached to a first interconnecting bar end 284 of a first interconnecting bar 282 and a second interconnecting bar end 285 of a second interconnecting bar 283, respectively. The first interconnecting bar 282 and the second interconnecting bar 283 are attached to a base plate 270 at a first receiving notch 296 and a second receiving notch 297, respectively. The first interconnecting bar 282 and the second interconnecting bar 283 are spaced apart and substantially parallel.

At a point between the handle 276 and the first arm end 280 and the second arm end 281 are lever fasteners 277 which mount the first lever arm 278 and the second lever arm 279 to a push plate first leg 214 and a push plate second leg 215, respectively. When the lever arm 275 is in the "down" position, the lever arm 275 is horizontal and the push plate first leg 214 and the push plate second leg 215 are perpendicular to the first lever arm 278 and the second lever arm 279. A push plate connecting leg 216 traverses the push plate top side 217, the side opposite the receiving grooves 271, 272, 273. The push plate connecting leg 216 connects the push plate first leg 214 and the push plate second leg 215. Push plate fasteners 218 fasten the push plate connecting leg 216 to the top side 217 of the push plate 211. A horizontal beam 219 projects from the push plate connecting leg 216 toward the first interconnecting bar 282 and the second interconnecting bar 283. At a beam end 255 positioned distally from the push plate is a cylindrical vertical guide rod 286. The guide rod 286 is attached at its top end 288 to the beam end 255, and projects vertically downward from the beam end 255.

The guide rod 286 passes through a cylindrical guide rod receiving hole 256 having substantially the same size and shape as the guide rod 286 to receive the guide rod 286. The bottom end 287 of the guide rod 286 has a horizontally projecting extracting plate resistor 298, which functions as a mechanism to prevent the extracting plate 62 of the modular blade assembly 10 from falling too low on the inside cylindrical blade 30. As the handle 276 of the lever arm 275 is pushed toward the "down" position, the push plate 211 moves down toward the stationary modular blade assembly 10 and the guide rod 286 slides through the cylindrical guide rod receiving hole 256.

The base plate 270 of the freestanding machine 200 has a push plate receiving hole 257 substantially in the center of the base plate 270. The push plate receiving hole 257 has substantially the same size and shape as the push plate 211, and receives the push plate 211 when the lever arm 275 is "down" and in a horizontal position. In the "down" position, the push plate 211 is flush with the base plate 270, and the beam end 255 is flat against the base plate 270. Also in the "down" position, the guide rod 286 is fully inserted through the guide rod receiving hole 256.

The freestanding machine 200 further includes a bottom side 292 to the base plate 270. A vertical support rod 259 extends downward from between the first receiving notch 296 and the second receiving notch 297 in the base plate 270. Wings 260 fasten to the bottom side 292 of the base plate 270 on either side of the push plate receiving hole 257 and at the support bracket fastening portals 54 on either side of the vertical support rod 259 directly beneath the bottom side 292 of the base plate 270. The first outside cylindrical blade arm 22 fastens to the vertical support rod 259 underneath the wing 260, and the second outside cylindrical blade arm 24 fastens to the vertical support rod 259 underneath the wing 260. The first inside cylindrical blade arm 32 and the second inside cylindrical blade arm 34 attach to the vertical support rod 259 via rod fasteners 238 at support bracket fastening portals 54 underneath the first outside cylindrical blade arm 22 and the second outside cylindrical blade arm 24, such that the cutting edges 21, 31, 43, 45 of the modular blade assembly 10 all face upward.

The vertical support rod 259 continues to the floor where a freestanding support base 258 is configured. This freestanding support base 258 can be in a plurality of different configurations as long as it 258 supports the freestanding machine 200 in a stable and upright position. A bucket support 236 is attached to the vertical support rod 259 and positioned below the modular blade assembly 10. As with the freestanding support base 258, the bucket support 236 can also be in a plurality of different configurations as long as it 236 supports a bucket 239 underneath the modular blade assembly 10 in a stable position.

Figure 10:
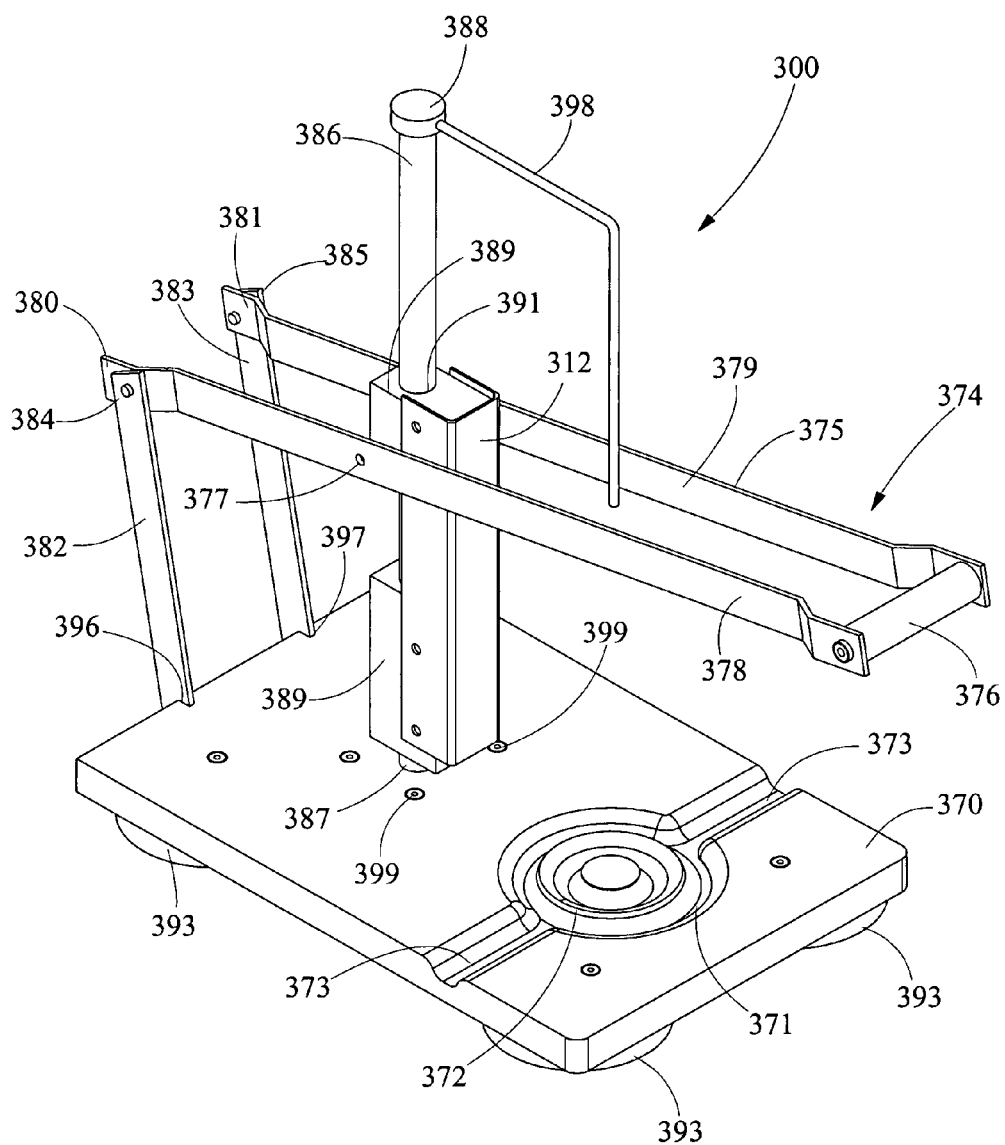
FIG. 10 is a perspective view of a tabletop machine sans a modular blade assembly.
Figure 11:
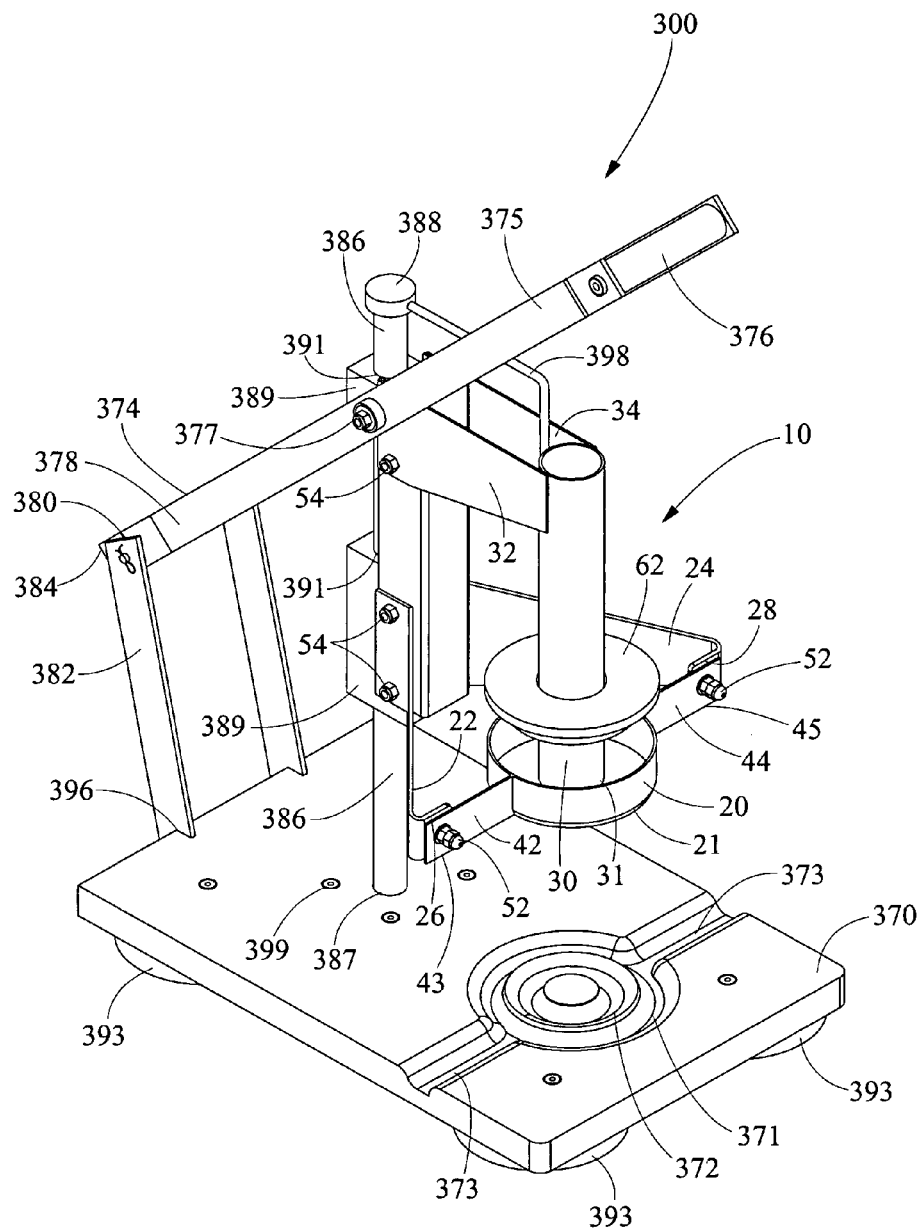
FIG. 11 is a perspective view of the tabletop machine of FIG. 10 with a modular blade assembly attached and in the raised position.
Figure 12:
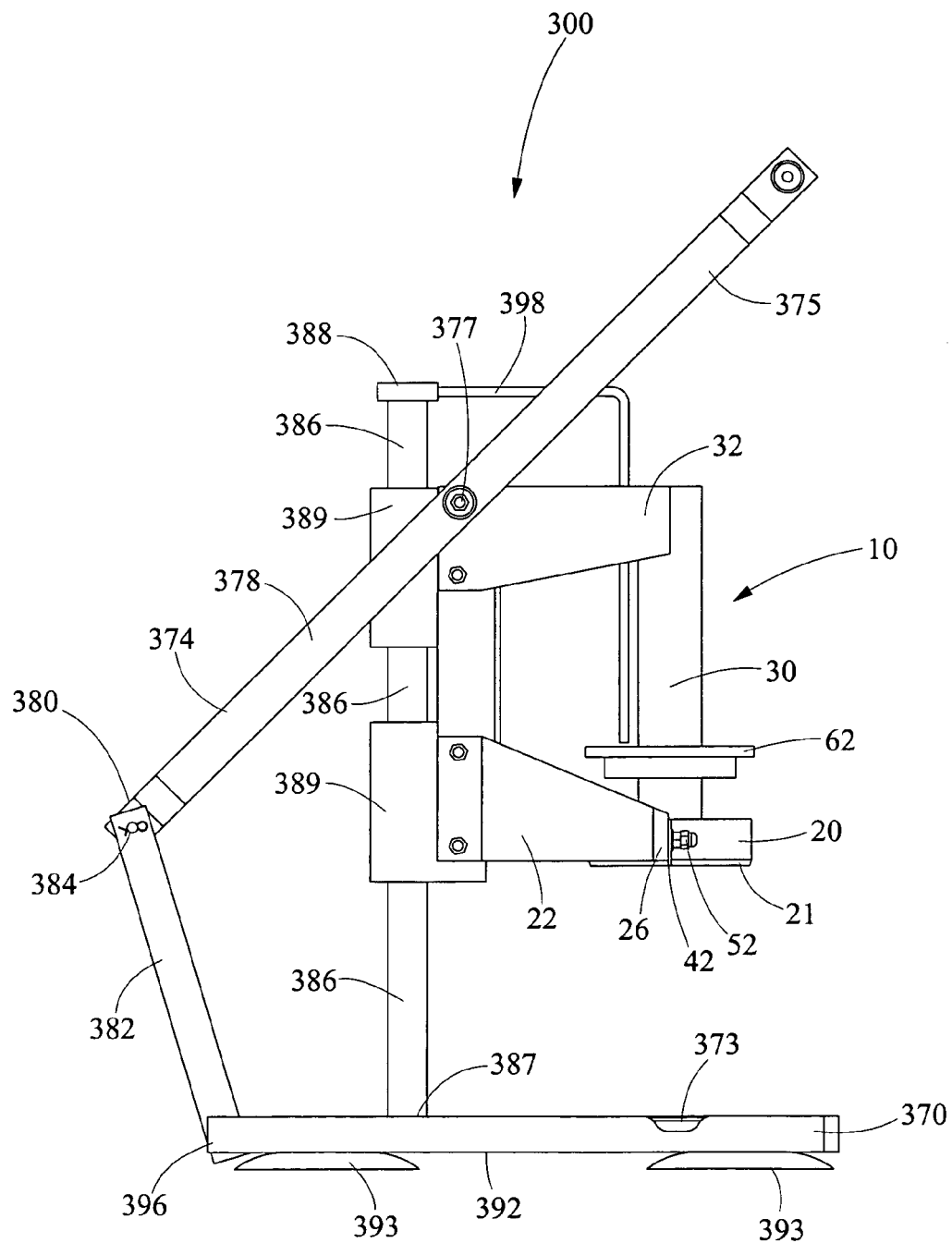
FIG. 12 is a side view of the tabletop machine of FIG. 10 with a modular assembly attached and in the raised position.
Figure 13:
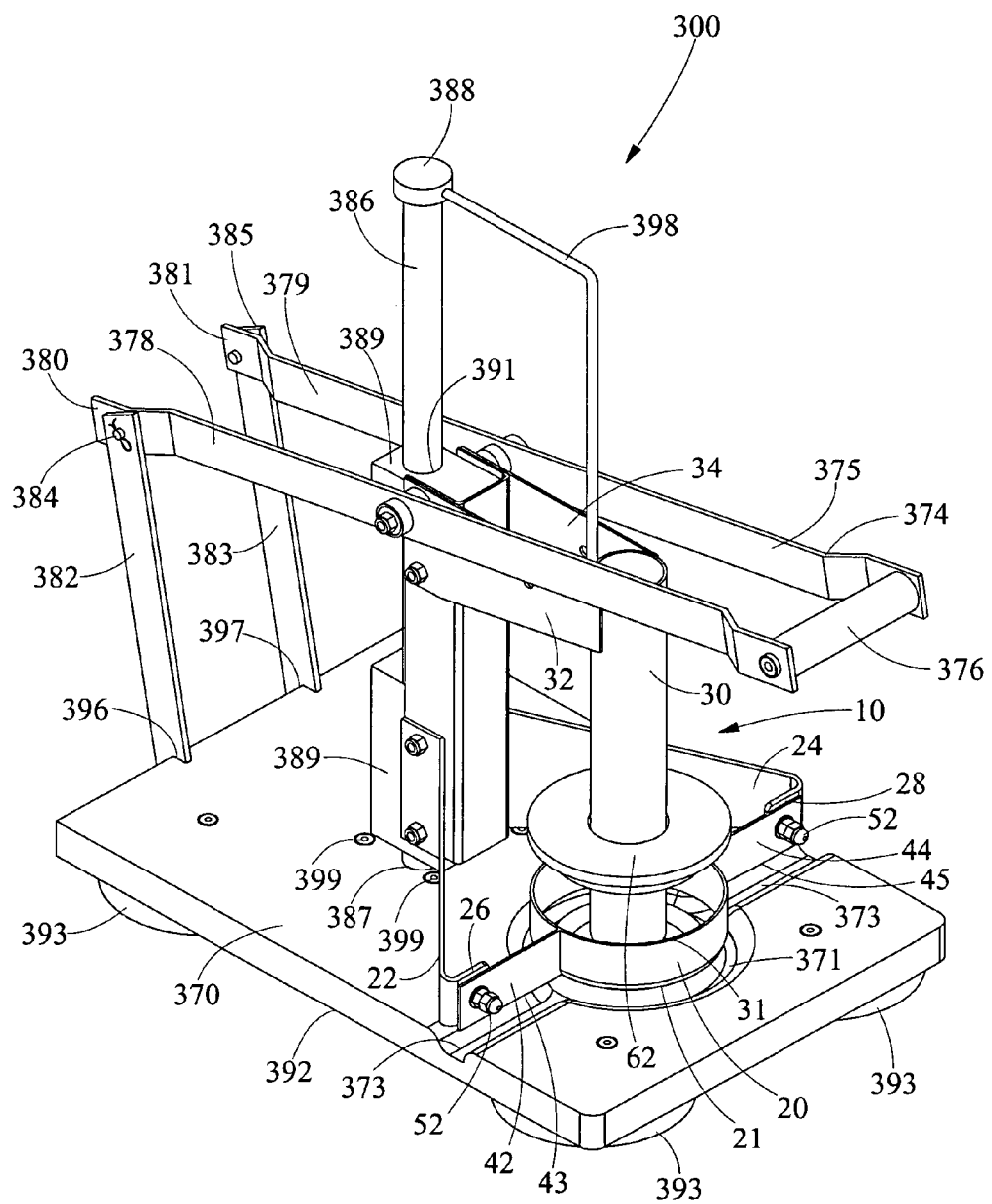
FIG. 13 is a perspective view of the tabletop machine of FIG. 10 with a modular blade assembly attached and in the lowered position.

Referring to FIG. 10, there is shown a tabletop machine 300. FIGS. 11-13 show the tabletop machine 300 having a modular blade assembly 10 mounted in place. The tabletop machine 300 has a cutting board base plate 370 for supporting produce, such as a pineapple for example, in an upright position and for resisting the cutting force applied to the produce. The cutting board base plate 370 has an outside circular receiving groove 371 for receiving the cutting edge 21 of the outside cylindrical blade 20 of the modular blade assembly 10. The cutting board base plate 370 has an inside circular receiving groove 372 for receiving the cutting edge 31 of the inside cylindrical blade 30 of the modular blade assembly 10. The outside circular receiving groove 371 and the inside circular receiving groove 372 are concentric. A radial receiving groove 373 traverses the cutting board base plate 370 and receives the cutting edges 43, 45 of the first radial blade 42 and the second radial blade 44. When the cutting edges 21, 31, 43, 45 are moved down toward the cutting board base plate 370, they are received in their respective receiving grooves 371, 372, 373 to assure that the cutting edges 21, 31, 43, 45 have passed entirely through the produce positioned on the base plate 370 and ensuring a complete severance through the produce.

The tabletop machine 300 also includes a blade moving mechanism 374 for moving the modular blade assembly 10 toward and away from the cutting board base plate 370, and therefore through the produce. The blade moving mechanism 374 includes a lever arm 375, providing the means for easily moving the modular blade assembly 10 up and down. The lever arm 375 has a first lever arm 378 and a second lever arm 379 spaced apart and substantially parallel to each other and a handle 376 extending between the first lever arm 378 and the second lever arm 379. The first lever arm 378 and the second lever arm 379 have a first arm end 380 and a second arm end 381, respectively, positioned distal from the handle 376. The first arm end 380 and the second arm end 381 are pivotally attached to a first interconnecting bar end 384 of a first interconnecting bar 382 and a second interconnecting bar end 385 of second interconnecting bar 383, respectively. The first interconnecting bar 382 and the second interconnecting bar 383 are attached to the cutting board base plate 370 at a first receiving notch 396 and a second receiving notch 397, respectively. The first interconnecting bar 382 and the second interconnecting bar 383 are spaced apart and parallel. At a point between the handle 376 and the first arm end 380 and the second arm end 381 are lever fasteners 377 which mount the first lever arm 378 and the second lever arm 379 to the first inside cylindrical blade arm 32 and the second inside cylindrical blade arm 34 at a blade assembly support bracket 312.

The tabletop machine 300 further includes a cylindrical vertical stationary guide rod 386 upon which the blade assembly support bracket 12 is positioned. The guide rod 386 is mounted to the cutting board base plate 370 at the guide rod bottom end 387. One or more mounting blocks 389 have cylindrical holes 391 cored through the middle, and the cylindrical holes 391 have substantially the same size and shape as the guide rod 386, wherein the cylindrical holes 391 are of the same size and shape as the guide rod 386 and receive the guide rod 386. The blade assembly support bracket 312 mounts onto the mounting block(s) 389 at the support bracket fastening portals 54. Movement of the lever handle 376 slides the mounting block(s) 389 and the attached blade assembly support bracket 312 up and down the guide rod 386, thus moving the modular blade assembly 10 toward and away from the cutting board base plate 370. The top end 388 of the guide rod 386 has a projecting L-shaped extracting plate resistor 398, having about a 90° angle, which functions as a mechanism to prevent the extracting plate 62 from rising too high on the inside cylindrical blade 30.

The tabletop machine 300 further includes a bottom side 392 to the cutting board base plate 370. The guide rod 386 mounts at its bottom end 387 via guide rod fasteners 399 to the base plate bottom side 392. A plurality of suction cups 393 are attached to base plate bottom side 392 for tabletop stability.

Figure 14:
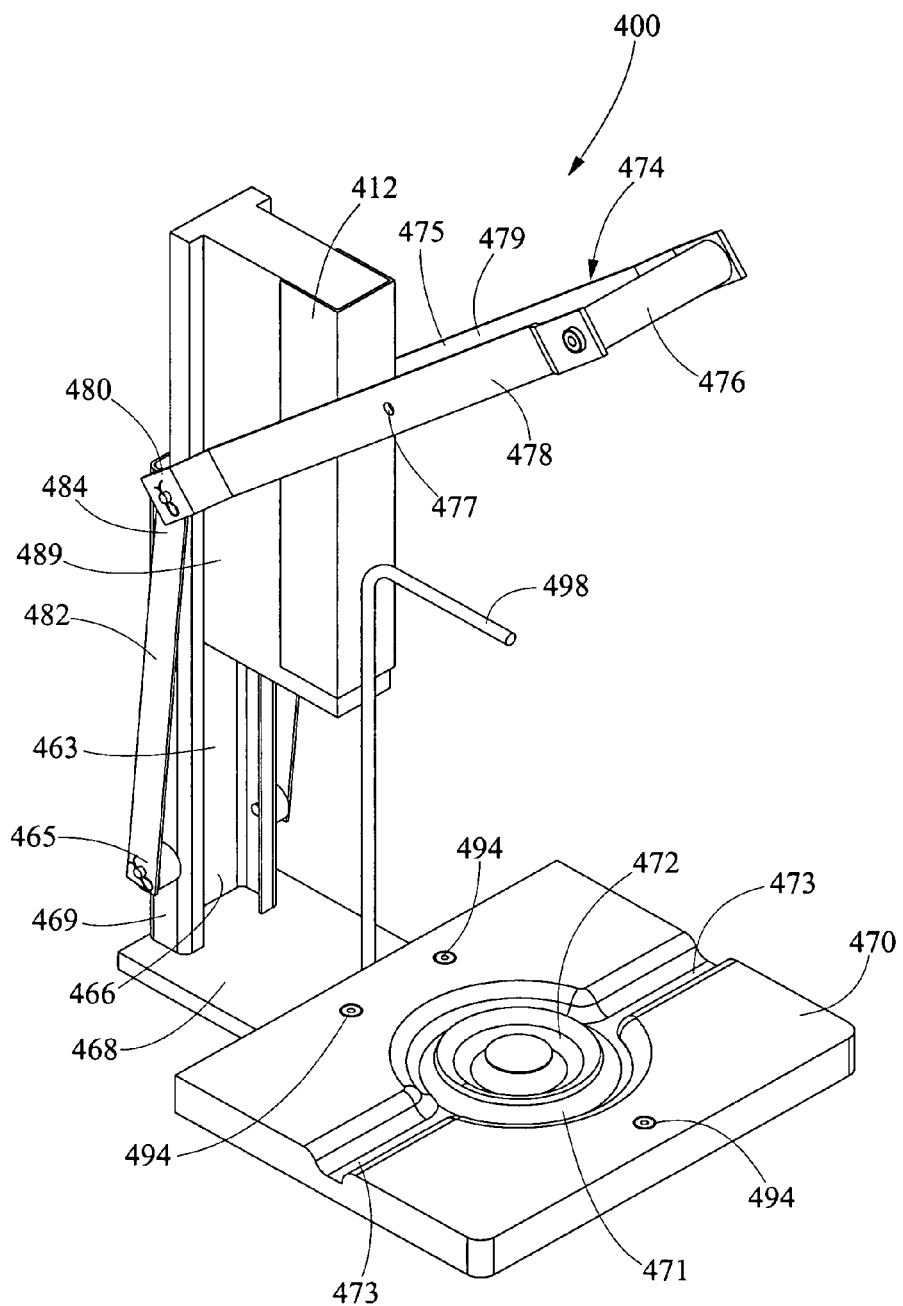
FIG. 14 is a perspective view of a wall mount machine sans a modular blade assembly.
Figure 15:
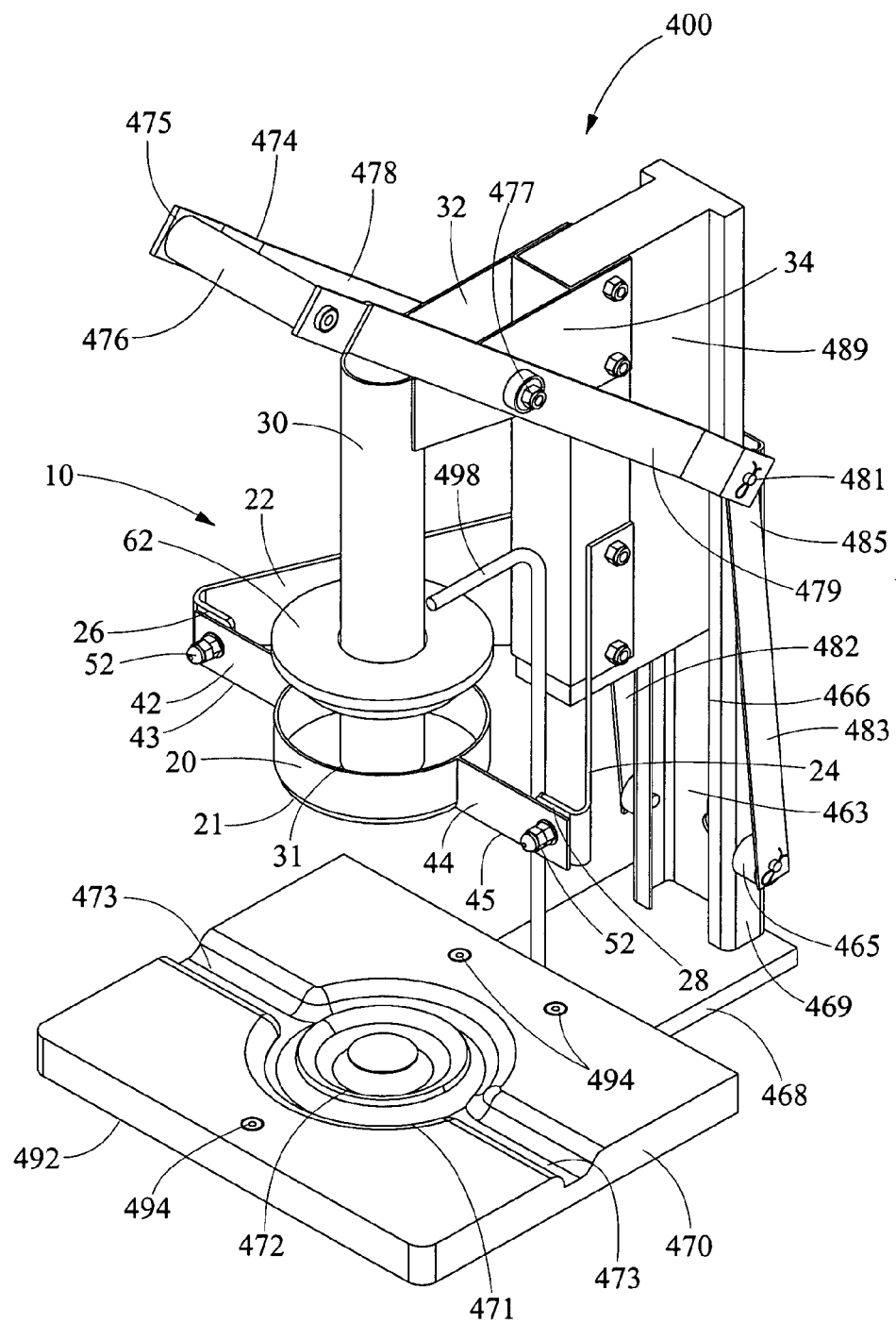
FIG. 15 is a perspective view of the wall mount machine of FIG. 14 with a modular blade assembly attached and in the raised position.
Figure 16:
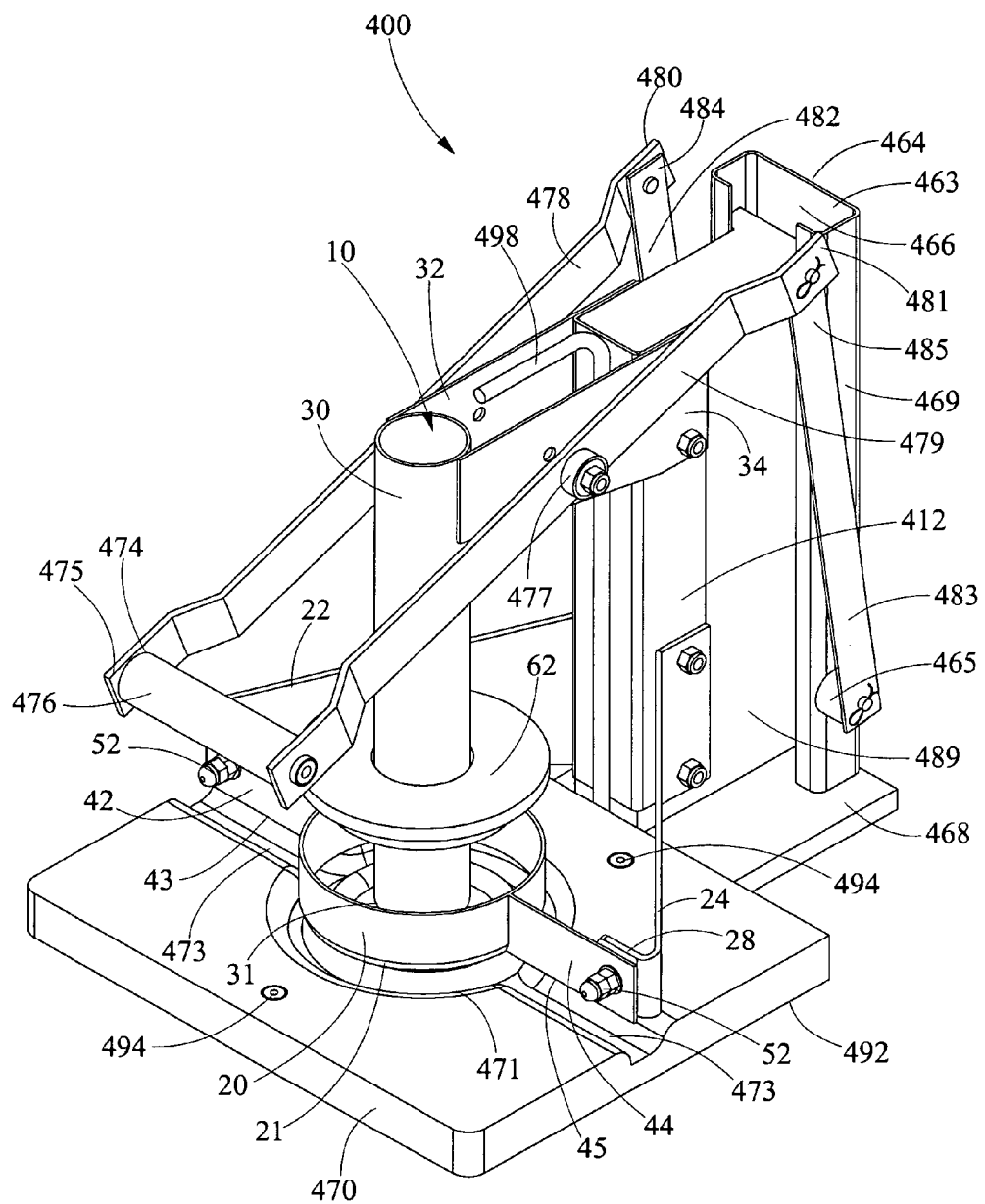
FIG. 16 is a perspective view of the wall mount machine of FIG. 14 with a modular blade assembly attached and in the lowered position.
Figure 17:
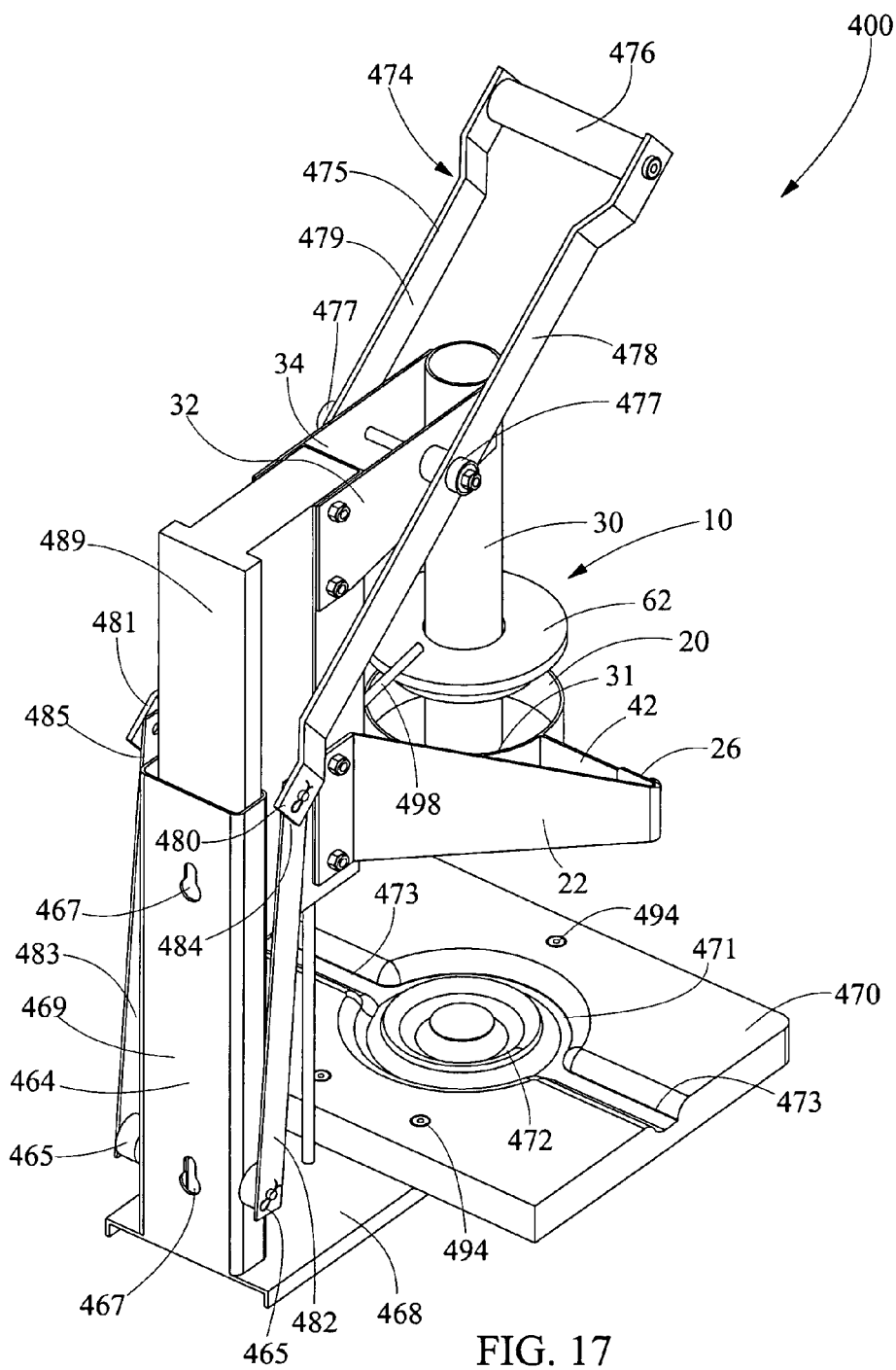
FIG. 17 is a rear perspective view of the wall mount machine of FIG. 14 with a modular blade assembly attached and in the raised position.
Figure 18:
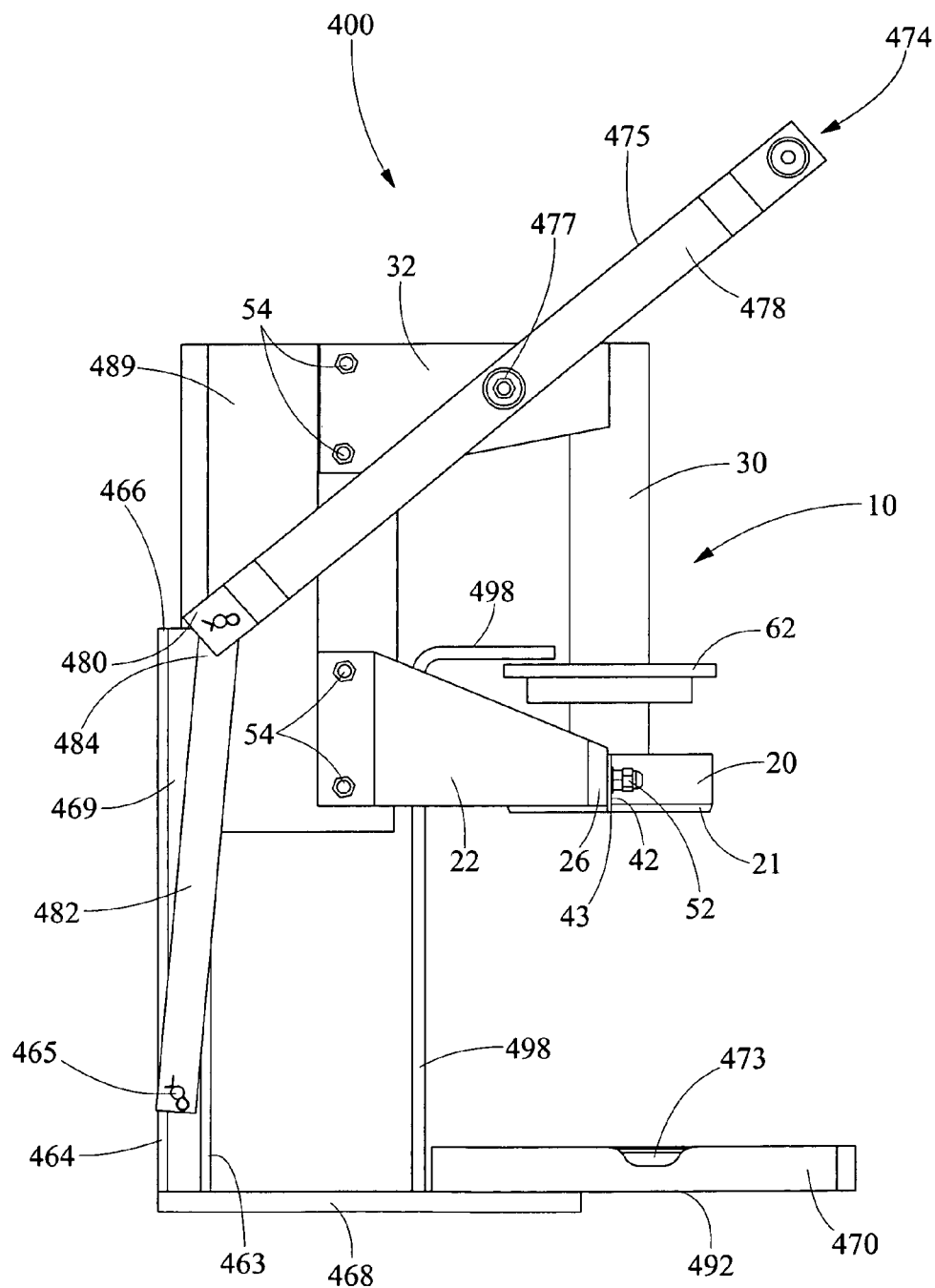
FIG. 18 is a side view of the wall mount machine of FIG. 14 with a modular blade assembly attached and in the raised position.

Now referring to FIG. 14, there is shown a wall-mount machine 400. FIGS. 15-18 show the wall-mount machine 400 having a modular blade assembly 10 mounted in place. The wall-mount machine 400 has a cutting board base plate 470 for supporting produce, such as a pineapple for example, in an upright position and for resisting the cutting force applied to the produce. The cutting board base plate 470 has an outside circular receiving groove 471 for receiving the cutting edge 21 of the outside cylindrical blade 20 of the modular blade assembly 10. The cutting board base plate 470 has an inside circular receiving groove 472 for receiving the cutting edge 31 of the inside cylindrical blade 30 of the modular blade assembly 10. The outside circular receiving groove 471 and the inside circular receiving groove 472 are concentric. A radial receiving groove 473 traverses the cutting board base plate 470 and receives the cutting edges 43, 45 of the first radial blade 42 and the second radial blade 44. When the cutting edges 21, 31, 43, 45 are moved down toward the cutting board base plate 470, they are received in their respective receiving grooves 471, 472, 473 to assure that the cutting edges 21, 31, 43, 45 have passed entirely through the produce positioned on the base plate 470 and ensuring complete severance through the produce.

The wall-mount machine 400 also includes a blade moving mechanism 474 for moving the modular blade assembly 10 toward and away from the cutting board base plate 470, and therefore through the produce. The blade moving mechanism 474 includes a lever arm 475, providing the means for easily moving the modular blade assembly 10 up and down. The lever arm 475 has a first lever arm 478 and a second lever arm 479 spaced apart and substantially parallel to each other, and a handle 476 extending between the first lever arm 478 and the second lever arm 479. The first lever arm 478 and the second lever arm 479 have a first arm end 480 and a second arm end 481, respectively, positioned distal from the handle 476. The first arm end 480 and the second arm end 481 are pivotally attached to a first interconnecting bar end 484 of a first interconnecting bar 482 and a second interconnecting bar end 485 of a second interconnecting bar 483, respectively. The first interconnecting bar 482 and the second interconnecting bar 483 are pivotally attached to a wall mounting bracket 469 via bracket fasteners 465 near a horizontal wall mount support plate 468.

The first interconnecting bar 482 and the second interconnecting bar 483 are spaced apart and substantially parallel. At a point between the handle 476 and the first arm end 480 and the second arm end 481 are lever fasteners 477 which mount the first lever arm 478 and the second lever arm 479 to the first inside cylindrical blade arm 32 and a second inside cylindrical blade arm 34 near the inside cylindrical blade 30 of the modular blade assembly 10.

The vertical wall mounting bracket 469 is attached to the horizontal wall mount support plate 468, which is positioned underneath the cutting board base plate 470 and provides extra support. The horizontal wall mount support plate 468 is perpendicular to the wall mounting bracket 469, and mounts to a bottom side 492 of the cutting board base plate 470 via base plate fasteners 494. A plurality of mounting portals 467 on the posterior side 464 of the wall mounting bracket 469 assist in mounting the wall-mount machine 400. The wall mounting bracket 469 further includes a mounting block receiving groove 466 on its anterior side 463. The mounting block receiving groove 466 receives one or more mounting blocks 489. A blade assembly support bracket 412 mounts onto the mounting block(s) 489 via a plurality of support bracket fastening portals 54. Movement of the lever handle 476 slides the mounting block(s) 489 up and down within and along the mounting block receiving groove 466, thus moving the modular blade assembly 10 toward and away from the cutting board base plate 470. An L-shaped extracting plate resistor 498 projects vertically upwards from a position on the wall mount support plate 468 between the wall mounting bracket 469 and the cutting board base plate 470. The extracting plate resistor 498 functions as a mechanism to prevent the extracting plate 62 from rising too high on the inside cylindrical blade 30.

The foregoing detailed description is given primarily for clearness of understanding and no unnecessary limitations are to be understood therefrom, for modifications will become obvious to those skilled in the art upon reading this disclosure, and may be made without departing from the spirit of the invention and scope of the appended claims.

What is claimed is:

1. A modular blade assembly for peeling and coring produce, comprising:
   an inside cylindrical blade having an inside cutting edge;
   an outside cylindrical blade disposed around said inside cylindrical blade and having an outside cutting edge;
   radial blades extending outward from said outside cylindrical blade;
   outside cylindrical blade arms releasably attached to and extending from said radial blades;
   inside cylindrical blade arms extending from said inside cylindrical blade; and,
   a plurality of support bracket fastening portals on said outside cylindrical blade arms and said inside cylindrical blade arms and located distal from said outside cylindrical blade and said inside cylindrical blade;
   wherein said support bracket fastening portals receive fasteners to releasably mount said modular blade assembly to a blade assembly support bracket of a wall mount machine at said support bracket fastening portals; and
   wherein said inside cylindrical blade is circumscribed by an extracting plate, said extracting plate having an outer circumference substantially equal to a circumference of said outside cylindrical blade.

2. A modular blade assembly for peeling and coring produce, comprising:
an inside cylindrical blade having an inside cutting edge;
an outside cylindrical blade disposed around said inside cylindrical blade and having an outside cutting edge;
radial blades extending outward from said outside cylindrical blade and having cutting edges;
outside cylindrical blade arms releasably attached to and extending from said radial blades;
inside cylindrical blade arms extending from said inside cylindrical blade; and,
a plurality of support bracket fastening portals on said outside cylindrical blade arms and said inside cylindrical blade arms, and located distal from said outside cylindrical blade and said inside cylindrical blade;
wherein said support bracket fastening portals receive fasteners to releasably mount said modular blade assembly to a blade assembly support bracket of a freestanding machine at said support bracket fastening portals;
a vertical support rod supporting a base plate, said base plate having a push plate receiving hole and a push plate moving mechanism;
a push plate mounted to said push plate moving mechanism, wherein the circumference of said push plate is substantially equal to the circumference of said push plate receiving hole, wherein said push plate receiving hole receives said push plate, and wherein said inside cutting edge and said outside cutting edge face upward toward said push plate;
wherein said push plate comprises:
an inside circular receiving groove formed in a bottom surface of said push plate of substantially equal circumference as said inside cutting edge in concentrical alignment with said inside cutting edge for receiving said inside cutting edge of said inside cylindrical blade when said push plate has been moved downwardly;
an outside circular receiving groove formed on said bottom surface of said push plate of substantially equal circumference as said outside cutting edge in concentrical alignment with said outside cutting edge for receiving said outside cutting edge of said inside cylindrical blade when said push plate has been moved downwardly; and
receiving grooves formed in said bottom surface of said push plate extending from said outside circular receiving groove, said receiving grooves being in alignment with said cutting edges of said radial blades for receiving said cutting edges of said radial blades when said push plate has been moved downwardly.

3. The modular blade assembly of claim 2, wherein said vertical support rod is mounted to a freestanding support base.

4. The modular blade assembly of claim 3, wherein said freestanding support base has a bucket support, said bucket support supporting a bucket.

5. A modular blade assembly for peeling and coring produce, comprising:
an inside cylindrical blade having an inside cutting edge;
an outside cylindrical blade disposed around said inside cylindrical blade and having an outside cutting edge;
radial blades extending outward from said outside cylindrical blade and having cutting edges;
outside cylindrical blade arms releasably attached to and extending from said radial blades;
inside cylindrical blade arms extending from said inside cylindrical blade; and,
a plurality of support bracket fastening portals on said outside cylindrical blade arms and said inside cylindrical blade arms, and located distal from said outside cylindrical blade and said inside cylindrical blade;
wherein said support bracket fastening portals receive fasteners to releasably mount said modular blade assembly to a blade assembly support bracket of a freestanding machine at said support bracket fastening portals;
a vertical support rod supporting a base plate, said base plate having a push plate receiving hole and a push plate moving mechanism;
a push plate mounted to said push plate moving mechanism, wherein the circumference of said push plate is substantially equal to the circumference of said push plate receiving hole, wherein said push plate receiving hole receives said push plate, and wherein said inside cutting edge and said outside cutting edge face upward toward said push plate; and
wherein said push plate moving mechanism has:
a push plate interconnecting leg mounted to a top side of said push plate and positioned between a push plate first leg and a push plate second leg;
a first lever arm and a second lever arm pivotally attached to said push plate first leg and push plate second leg;
a handle extending between said first lever arm and said second lever arm, said handle positioned distal from a first arm end and a second arm end; and
a first interconnecting bar and a second interconnecting bar attached to said first arm end and said second arm end, wherein said first interconnecting bar and said second interconnecting bar mount said push plate moving mechanism to said base plate.

6. The modular blade assembly of claim 5, wherein said first lever arm and said second lever arm are spaced apart and substantially parallel.

7. The modular blade assembly of claim 5, wherein a beam extends horizontally and rearwardly from said push plate interconnecting leg toward said vertical support rod, said beam having a vertical guide rod projecting substantially horizontal with said vertical support rod and extending through a guide rod receiving hole in said base plate.

8. The modular blade assembly of claim 7, wherein said guide rod comprises:
a guide rod bottom end positioned below and distal to said beam; and
an extracting plate resistor horizontally projecting from said guide rod bottom end toward said modular blade assembly.

9. A modular blade assembly for peeling and coring produce, comprising:
an inside cylindrical blade having an inside cutting edge;
an outside cylindrical blade disposed around said inside cylindrical blade and having an outside cutting edge;
radial blades extending outward from said outside cylindrical blade and having cutting edges;
outside cylindrical blade arms releasably attached to and extending from said radial blades;
inside cylindrical blade arms extending from said inside cylindrical blade; and,
a plurality of support bracket fastening portals on said outside cylindrical blade arms and said inside cylindrical blade arms, and located distal from said outside cylindrical blade and said inside cylindrical blade;
wherein said support bracket fastening portals receive fasteners to releasably mount said modular blade assembly to a blade assembly support bracket of a freestanding machine at said support bracket fastening portals; and
wherein said inside cylindrical blade is circumscribed by an extracting plate, said extracting plate having an outer circumference substantially equal to a circumference of said outside cylindrical blade.

10. A modular blade assembly for coring and peeling produce, comprising:
an inside cylindrical blade having an inside cutting edge;
an outside cylindrical blade disposed around said inside cylindrical blade;
radial blades opposed and extending outward from said outside cylindrical blade and having cutting edges;
outside cylindrical blade arms releasably attached to and extending from said radial blades;
inside cylindrical blade arms extending from said inside cylindrical blade; and,
a plurality of support bracket fastening portals on said outside cylindrical blade arms and said inside cylindrical blade arms and located distal from said outside cylindrical blade and said inside cylindrical blade;
wherein said support bracket fastening portals receive fasteners to releasably mount said modular blade assembly to a blade assembly support bracket of a tabletop machine at said support bracket fastening portals;
wherein said tabletop machine comprises:
a vertical guide rod mounted to a cutting board base plate;
a mounting block slidably attached to said guide rod, said blade assembly support bracket mounted to said mounting block; and
a blade moving mechanism pivotally attached to said blade assembly support bracket and said mounting block and mounted to said cutting board base plate such that said inside cutting edge and said outside cutting edge face down toward said cutting board base plate.

11. The modular blade assembly of claim 10, wherein said cutting board base plate comprises:
an inside circular receiving groove of substantially equal circumference as said inside cutting edge in concentrical alignment with said inside cutting edge for receiving said inside cutting edge of said inside cylindrical blade when said modular blade assembly has been moved downwardly;
an outside circular receiving groove of substantially equal circumference as said outside cutting edge in concentrical alignment with said outside cutting edge for receiving said outside cutting edge of said inside cylindrical blade when said modular blade assembly has been moved downwardly; and
receiving grooves extending outwardly from said outside circular receiving groove, said receiving grooves being in alignment with said cutting edges of said radial blades for receiving said cutting edges of said radial blades when said modular blade assembly has been moved downwardly.

12. The modular blade assembly of claim 10, wherein said blade moving mechanism comprises:
a first lever arm and a second lever arm pivotally attached to said blade assembly support bracket and said mounting block;
a handle extending between said first lever arm and said second lever arm, said handle positioned distal from a first arm end and a second arm end; and
a first interconnecting bar pivotally attached to said first arm end and a second interconnecting bar pivotally attached to said second arm end, wherein said first interconnecting bar and said second interconnecting bar are mounted to said cutting board base plate.

13. The modular blade assembly of claim 12, wherein said first lever arm and said second lever arm are spaced apart and substantially parallel.

14. The modular blade assembly of claim 12, wherein said first interconnecting bar and said second interconnecting bar are spaced apart and substantially parallel.

15. The modular blade assembly of claim 10, wherein said guide rod further comprises:
a guide rod bottom end attached to said cutting board base plate;
a guide rod top end positioned above and distal from said guide rod top end; and
an extracting plate resistor horizontally projecting from said guide rod top end toward said modular blade assembly.

16. The modular blade assembly of claim 10, wherein said guide rod is cylindrical and said mounting blocks have cylindrical holes substantially equal in circumference to said guide rod, wherein said cylindrical holes receive said guide rod.

17. The modular blade assembly of claim 10, wherein said cutting board base plate has a plurality of suction cups positioned on a bottom side of said cutting board base plate.

18. A modular blade assembly for coring and peeling produce, comprising:
an inside cylindrical blade having an inside cutting edge;
an outside cylindrical blade disposed around said inside cylindrical blade;
radial blades opposed and extending outward from said outside cylindrical blade and having cutting edges;
outside cylindrical blade arms releasably attached to and extending from said radial blades;
inside cylindrical blade arms extending from said inside cylindrical blade; and,
a plurality of support bracket fastening portals on said outside cylindrical blade arms and said inside cylindrical blade arms and located distal from said outside cylindrical blade and said inside cylindrical blade;
wherein said support bracket fastening portals receive fasteners to releasably mount said modular blade assembly to a blade assembly support bracket of a tabletop machine at said support bracket fastening portals;
wherein said inside cylindrical blade is circumscribed by an extracting plate, said extracting plate having an outer circumference substantially equal to a circumference of said outside cylindrical blade.

19. A modular blade assembly for peeling and coring produce, comprising:
an inside cylindrical blade having an inside cutting edge;
an outside cylindrical blade disposed around said inside cylindrical blade and having an outside cutting edge;
radial blades extending outward from said outside cylindrical blade;
outside cylindrical blade arms releasably attached to and extending from said radial blades;
inside cylindrical blade arms extending from said inside cylindrical blade; and,
a plurality of support bracket fastening portals on said outside cylindrical blade arms and said inside cylindrical blade arms and located distal from said outside cylindrical blade and said inside cylindrical blade;
wherein said support bracket fastening portals receive fasteners to releasably mount said modular blade assembly to a blade assembly support bracket of a wall mount machine at said support bracket fastening portals;
wherein said wall mount machine comprises:
a vertical wall mounting bracket mounted to a wall mount support plate;
a cutting board base plate mounted to said wall mount support plate;

a mounting block slidably positioned within a mounting block receiving groove on an anterior side of said wall mounting bracket, said blade assembly support bracket mounted to said mounting block; and a blade moving mechanism pivotally attached to said inside cylindrical blade arms;

wherein said modular blade assembly mounts to said blade assembly support bracket at said support bracket fastening portals and said blade assembly support bracket mounts to said mounting blocks at said support bracket fastening portals; and wherein said mounting block slides up and down said receiving groove as said modular blade assembly moves downwardly toward and upwardly away from said cutting board base plate.

20. The modular blade assembly of claim 19, wherein said cutting board base plate comprises:

an inside circular receiving groove of substantially equal circumference as said inside cutting edge in concentrical alignment with said inside cutting edge for receiving said inside cutting edge of said inside cylindrical blade when said modular blade assembly has been moved downwardly;

an outside circular receiving groove of substantially equal circumference as said outside cutting edge in concentrical alignment with said outside cutting edge for receiving said outside cutting edge of said inside cylindrical blade when said modular blade assembly has been moved downwardly; and radially symmetric receiving grooves extending outwardly from said outside circular receiving groove, said receiving grooves being in alignment with said cutting edges of said radial blades for receiving said cutting edges of said radial blades when said modular blade assembly has been moved downwardly.

21. The modular blade assembly of claim 19, wherein said blade moving mechanism comprises:

a first lever arm and a second lever arm pivotally attached to first inside cylindrical blade arms;

a handle extending between said first lever arm and said second lever arm, said handle positioned distal from a first arm end and a second arm end; and a first interconnecting bar pivotally attached to said first arm end and a second interconnecting bar pivotally attached to said second arm end, wherein said first interconnecting bar and said second interconnecting bar are mounted to said wall mounting bracket.

22. The modular blade assembly of claim 21, wherein said first lever arm and said second lever arm are spaced apart and substantially parallel.

23. The modular blade assembly of claim 21, wherein said first interconnecting bar and said second interconnecting bar are spaced apart and substantially parallel.

24. The modular blade assembly of claim 19, wherein said wall mount support plate includes an extracting plate resistor projecting vertically upward from said wall mount support plate and angling 90° toward said modular blade assembly.

* * * * *